(12) United States Patent
Su

(10) Patent No.: US 6,679,163 B1
(45) Date of Patent: Jan. 20, 2004

(54) STRUCTURE OF A ROASTING DEVICE

(76) Inventor: Yung Sen Su, P.O. Box 82-144, Taipei (TW)

(*) Notice: Subject to any disclaimer, the term of this patent is extended or adjusted under 35 U.S.C. 154(b) by 0 days.

(21) Appl. No.: 10/446,931

(22) Filed: May 29, 2003

(51) Int. Cl.[7] .............................. A23L 1/00; A47J 27/00; A47J 37/00
(52) U.S. Cl. .............................. 99/341; 99/339; 99/355; 99/357; 99/348; 99/483
(58) Field of Search .................. 99/325–334, 339–341, 99/352–355, 342, 357, 348, 443 R, 443 C, 486; 426/231–233, 523; 219/400, 401, 413, 490, 491, 494

(56) References Cited

U.S. PATENT DOCUMENTS 6,234,065 B1 * 5/2001 Su .............................. 99/341
6,499,391 B1 * 12/2002 Su .............................. 99/341

* cited by examiner

Primary Examiner—Timothy F. Simone
(74) Attorney, Agent, or Firm—Leong C. Lei

(57) ABSTRACT

An improved structure of a roasting device is disclosed. The roasting device has a bean-roasting chamber with a body mounted with a heat dissipation seat. The heat dissipation seat is provided with a bottom seat having a position hole and contains a fan. The top portion of the motor is a debris disc having through holes and net body. The blowing of fan accelerates cooling of the roasted beans and the quality of bean is preserved. The external of the bean roasting chamber is provided with fastening hook for mounting a protective net having a fastening ring so that the touch of the high temperature bean is prevented.

2 Claims, 6 Drawing Sheets

STRUCTURE OF A ROASTING DEVICE

BACKGROUND OF THE INVENTION (a) Technical Field of the Invention

The present invention relates to roasting device, and in particular, a roasting device having a body with a heat dissipation seat at the lower portion.

(b) Description of the Prior Art

Referring to FIGS. 1 and 2, there is shown a conventional roasting device having a roasting chamber 11 and debris collection disc 1000. There are numerous drawbacks found in convention device such as the front cover 2 cannot be opened and therefore cleaning is not convenient.

When the bean-roasting chamber 11 rotates, the roasting beans 8 are squeezed and the bean cover 4 may be pushed away or overflow. This is not convenient in used. The recess 12 at the lower section of the body 1 is provided with motor 13 and a protruded shaft center 131 mounted to the tray 14. A cooling disc 10 having net hole is then connected to the cooling rod 101. The rotation of the shaft center 131 allows cooling of the roasting bean 8. However, the cooling disc 10 at the tray 14 and the recess 12 is not supported. After the motor 13 is rotated, there may be an engagement where the tray 14 and the cooling disc 10 are driven in the course of rotation. This will cause a failure in the cooling rod 10 and the roasting bean 8 cannot be triggered.

The conventional cooling rod 101 can have single side rotation which cannot push or stir the roasting bean 8 in the course of roasting. Besides the tray 14 and the cooling tray 10 are stacked and sealed spaced which does not allow rapid cooling. The spaced fan 100 has poor cooling effect and therefore it is time wasting which affects the quality of beans.

Further the manual control switch 6 and the single power indicator 7 are not accurate and therefore the quality and taste of the roasting beans 8 cannot be improved.

Furthermore, there is no protective device for the outside of the bean-roasting chamber and therefore there is a possibility that the user touches the high temperature bean-roasting chamber 11.

SUMMARY OF THE INVENTION

Accordingly, it is an object of the present invention to provide an improved structure of a roasting device having a body, a cooling disc, a heat dissipation seat mounted below the body and a base seat provided with debris disc protruded from shaft center of the motor, characterized in that the base seat is provided with through holes and contains a fan, and the debris disc on the top portion of the fan is provided with through holes and a filter body is provided on the top of the through hole preventing object from falling, facilitating the cooling of roasted bean on the cooling disc of the roasting device.

Yet a further object of the present invention is to provide an improved structure of a roasting device, wherein the outside of the roasting chamber is provided with fastening hook having a protective frame provided with a fastener ring to prevent bum when directly in contact.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 8A is an enlarged view of a portion of FIG. 8.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
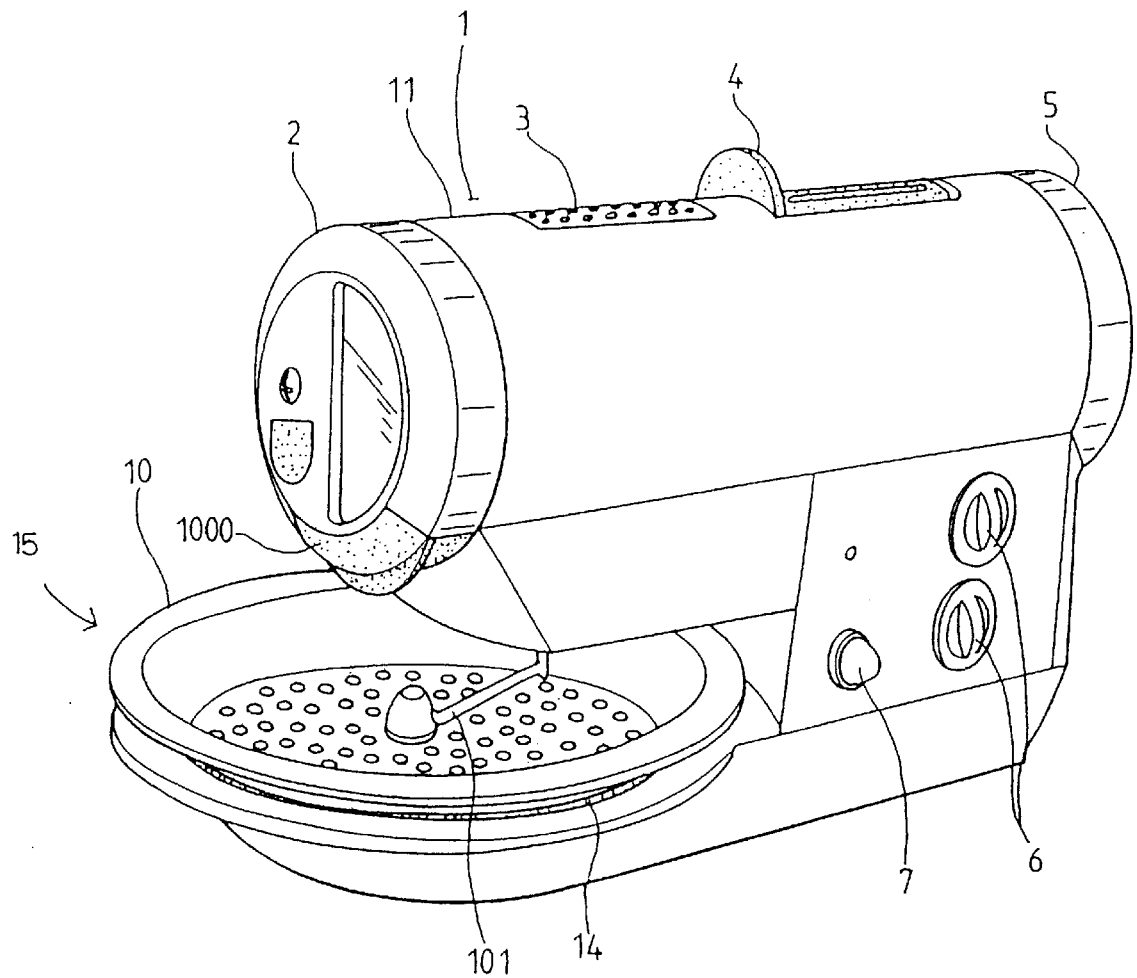
FIG. 1 is a perspective view of a conventional roasting device.
Figure 2:
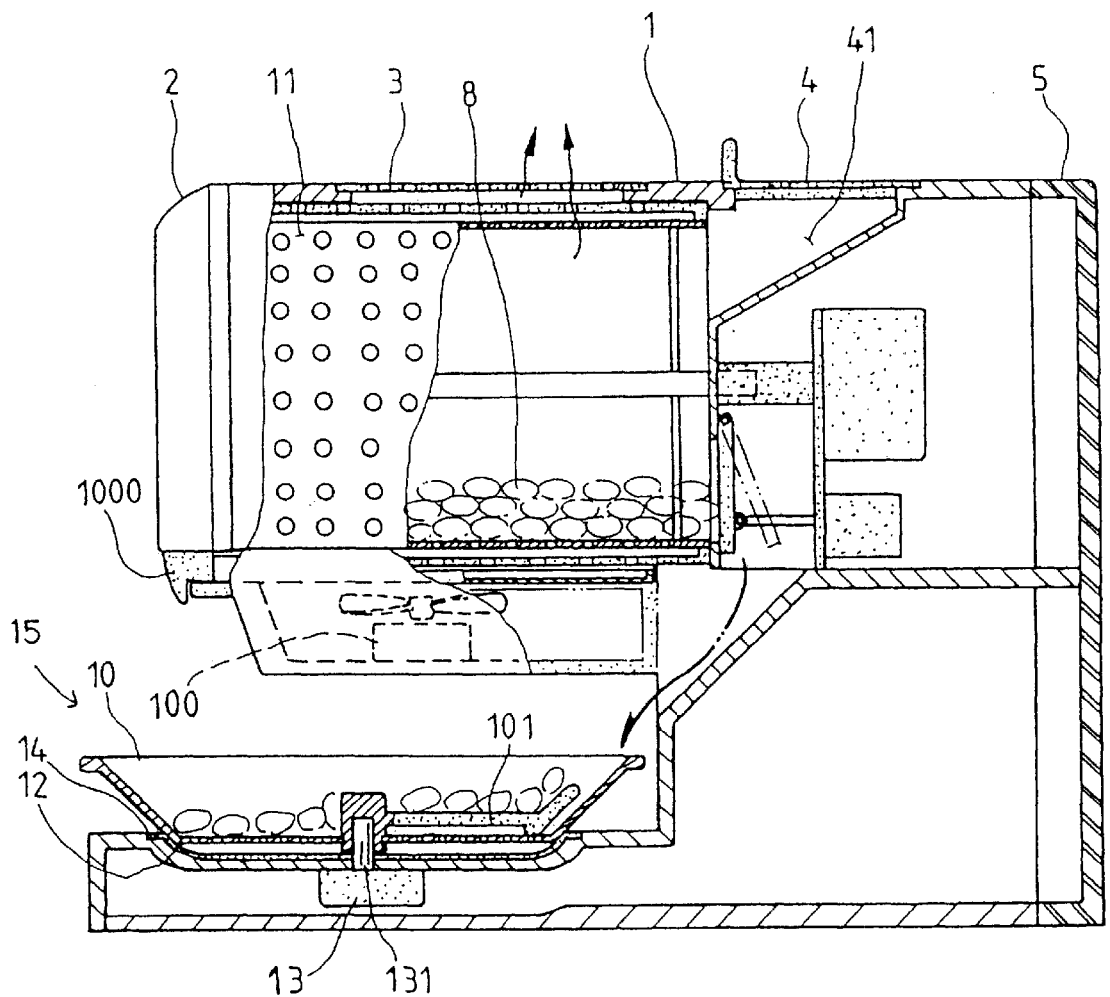
FIG. 2 is a sectional view of a conventional roasting device of FIG. 1.
Figure 3:
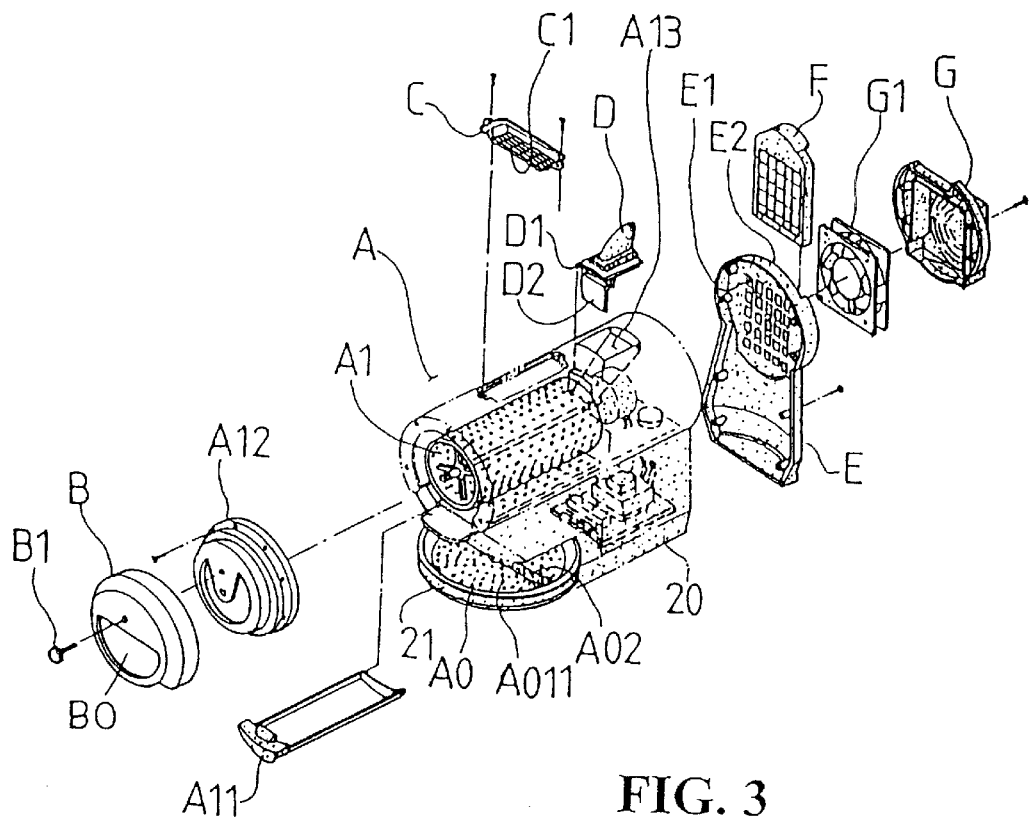
FIG. 3 is a perspective exploded view of a roasting device of the present invention.
Figure 4:
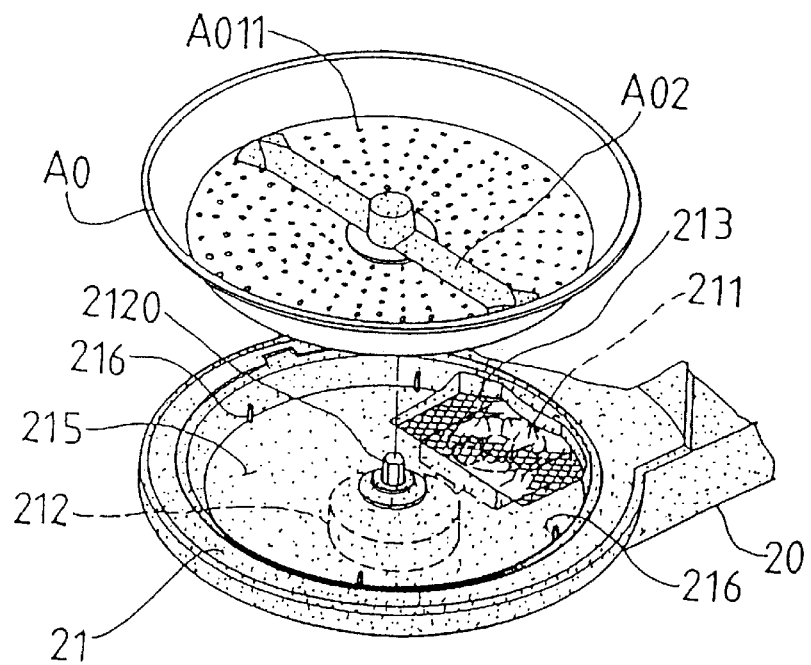
FIG. 4 is a perspective exploded view of a heat dissipation seat of the present invention.
Figure 5:
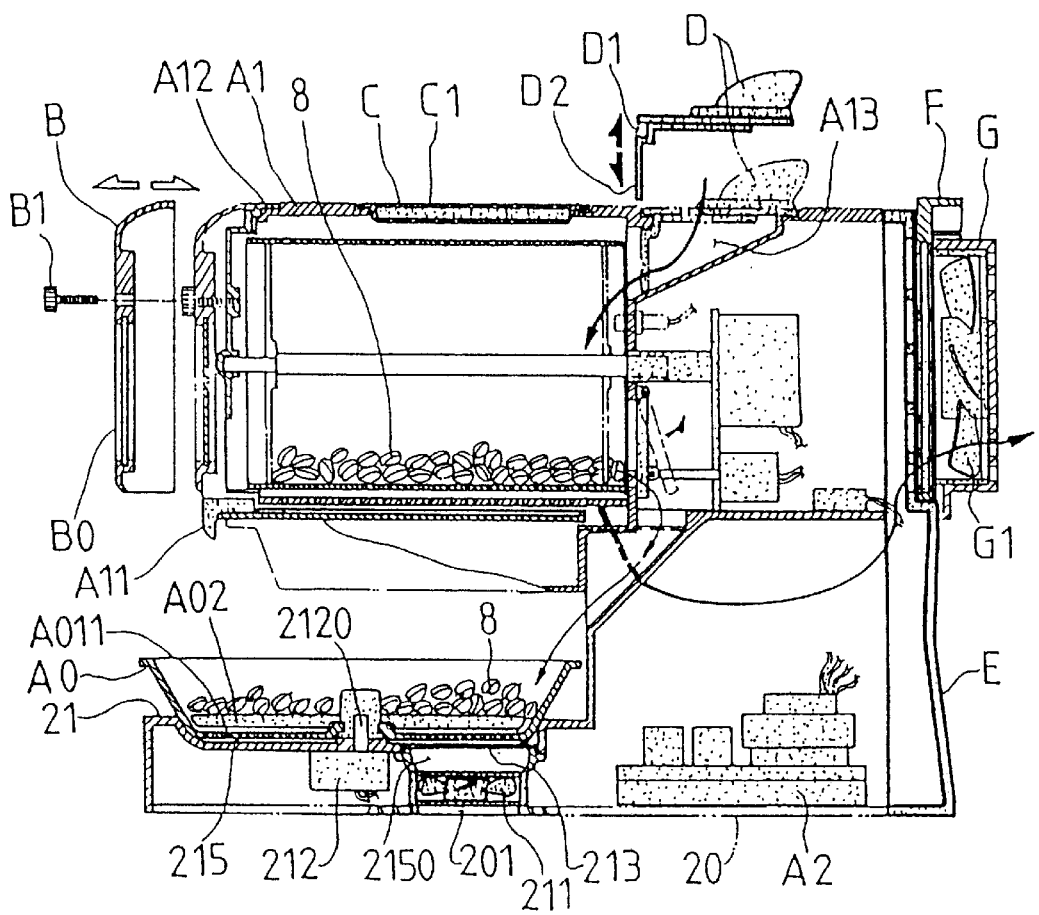
FIG. 5 is a sectional view showing the direction of the movement of the roasting beans and the path of the exhaust gas in accordance with the present invention.

Referring to FIGS. 3, 4 and 5, there is shown a perspective exploded view of the heat dissipation seat 21 of a roasting device of the present invention. The device comprises a body A, a bean-roasting chamber A1, a bean inlet cover D, a front frame board A12, a front cover B, screw nut B1, rear cover E, a fan G1, filter F, fan G, a controller A2, a heat dissipation seat 21, control panel H, a protective net A112.

The bean-roasting chamber A1 of the body A is mounted with a heating tube and a rotating shaft, and the front of the chamber A1 has a front frame board A12 with a front cover B having a front window B0. The two components can be mounted and disassembled, by rotating the connection element B1 and the cleaning of the bean-roasting chamber A1 is rapid. The air filter board C at the top of the body A is provided with a filtering cotton C1. The rear section of the chamber A1 is provided in sequence the rear cover E with net hole E1 and the rear end of the rear cover E is mounted with a fan G1 so as to force out the exhausted air generated during roasting. The rear end of the rear cover E and the fan seat G are provided with a notch E2 having a filter F can be insertably replaced. The activation of the fan G1 will drive out the exhausted gas, and the filter F can filter away the oil fume and particles (in the direction as shown in FIG. 5). The top portion of the bean-roasting chamber A1 is a bean inlet A13 with a bean-inlet cover D. There is a folded region D1 at the bean inlet cover D to prevent beans from ejected out and the edge of the bean-roasting chamber A1 is engaged with the folded region D1 which extended to provided a blocking block D2. The front side of the body A is a heat dissipation seat 21 for rapid cooling of the roasted bean 8.

Figure 6:
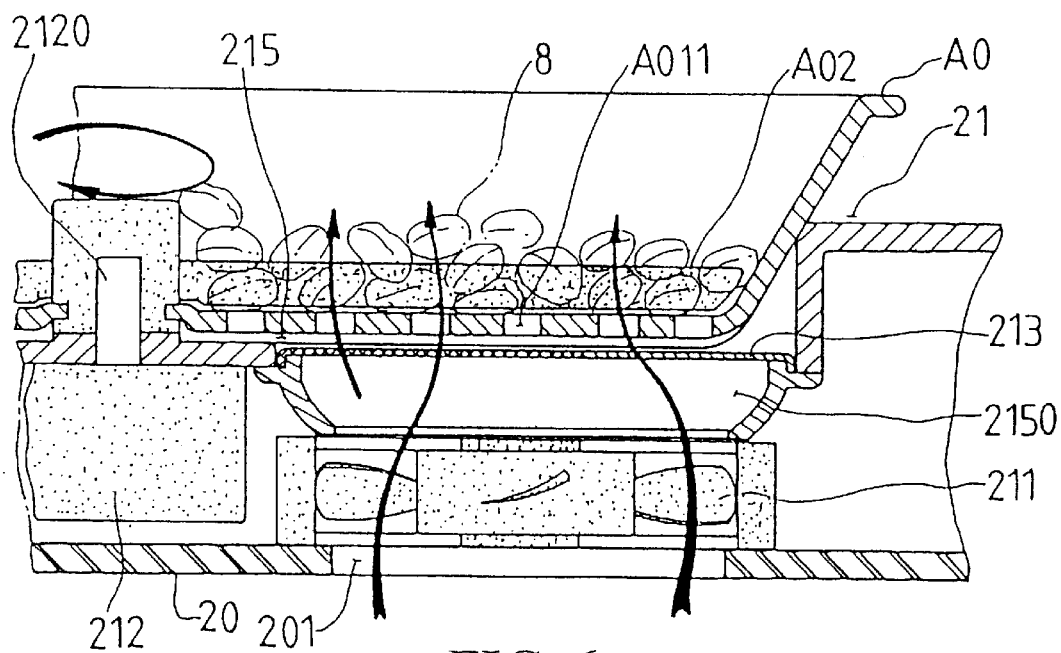
FIG. 6 is a schematic view showing the cooling of the roasting bean by the heat dissipation seat in accordance with the present invention.
Figure 7:
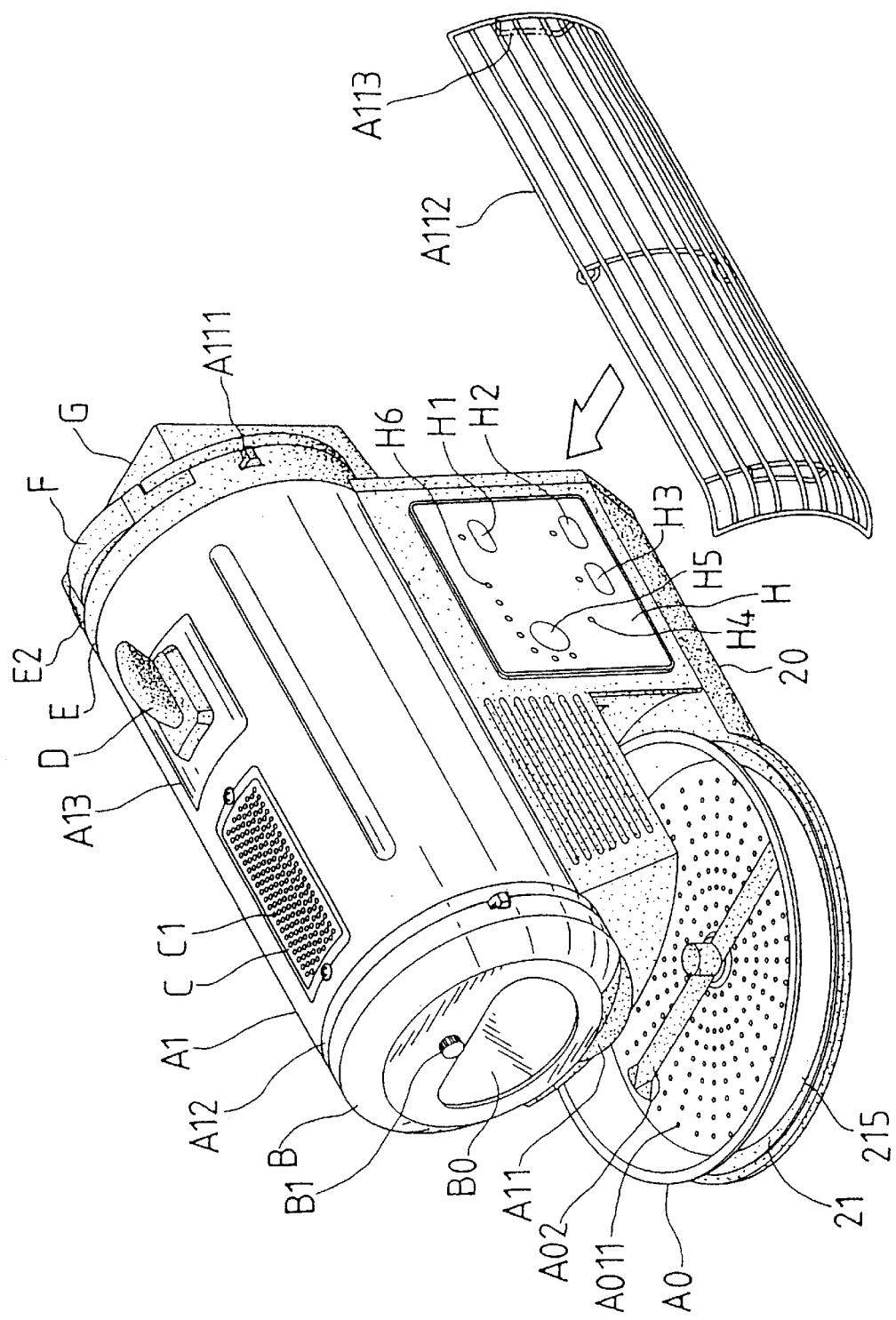
FIG. 7 is a perspective exploded view of the protective net of the present invention.
Figure 8:
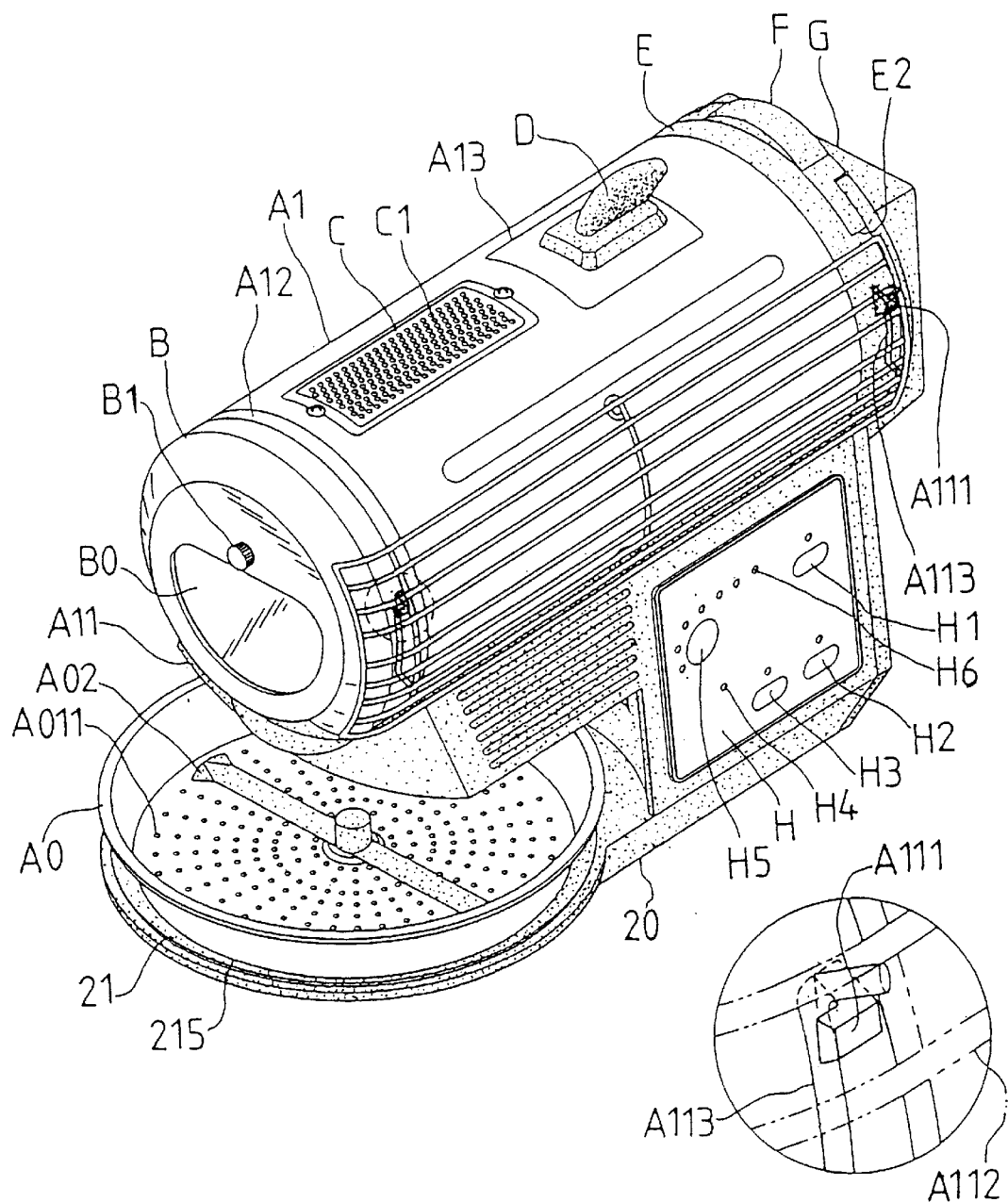
FIG. 8 is a perspective view of the protective net and a partial enlarged view in accordance with the present invention.

As shown in FIGS. 4, 5 and 6, the bottom seat 20 of the heat dissipation seat 21 is provided with hole position 201 for the inlet of air to the fan 211. The motor 212 at the side of the fan 211 is the power source for stirring the roasted beans 8. The motor 212 is provided with a motor shaft 2120. A debris disc 215 is provided at the top section of the motor 212 and the circumferential edge of the bottom of the debris disc 215 is provided with protruded rod 216. The bottom face at one lateral side is a through hole 2150 corresponding to the fan 211. The top portion of the through hole 2150 is a net body 213 to prevent foreign object to enter and protect the fan 211 to operate normally and safely. The through hole 2150 allows air stream to blow out by the fan 211 and through the hole position 201 of the bottom seat 20 to the debris disc 215 upward.

For the roasting of beans 8, the dropped beans from the bean-roasting chamber A1 is collected, as shown in FIG. 5. A cooling disc A0 is positioned at the top portion of the debris disc 215 and the top portion of the cooling disc A0 is provided with a plurality of net holes A011. The net holes A011 allow the air stream from the fan 211 to cool the roasting beans 8. The net holes A011 provide securing of the protruded rod 216, as shown in FIG. 4. There is a triggering rod A02 for stirring the roasting beans 8 in the cooling process. The triggering rod A02 is movably engaged with the center hole of the cooling disc A0. The shaft center 2120 of the motor is driven by the motor 212. Thus when motor 212 and the triggering rod A02 are rotated, the roasting beans 8 are stirred and the beans are cooled without rotating the debris disc 215 and the cooling disc A0.

As a result, the triggering rod A02 will not be damaged, and the roasting beans 8 are fully stirred. The blowing of the fan 211 will rapidly cool the roasting beans 8 and the quality of the beans 8 is retained.

As shown in FIGS. 5, 7, 8 and 8A, there is shown the sectional view of the roasting beans 8 moving direction and the exhausted gas path. There is an electronic controller A2, time delayed button H1, switch H2, instance bean discharged button H3, indicator H4, time selector button H5, electronic-controlled device of the control panel H of the indictor H6 such that the control of roasting of bean can be precise. The time indicator H6 is divided into 7 sections. By selection of the time with button H5, the time can be extended. By pressing the extended time button H1 to discharge roasting beans 8 to drop on the cooling disc A0. The instance bean discharge button H3 is pressed. An electromagnetic valve is provided at one side of the bean-roasting chamber A1 which is used to open the blocking board (one inclined corner of FIG. 5 shows a blocking block). The roasting beans 8 will be dropped to the cooling disc A0 via the sliding path. To provided rapid heat dissipation, an exhaust plate A1 is provided to the bottom section of the bean-roasting chamber A1, and the heat generated of the bean-roasting chamber A1 is moved upward.

To provide better safety, and to avoid high temperature from contacting with hands, the roasting chamber A1, close to the control panel H is provided with a fastening hook A111, and the external side of the fastening hook A111 is provided with a protective net having a fastening ring A113 to fasten the protective net A112 to the bean-roasting chamber A1. There is a distance between the protective net A112 and the bean-roasting chamber A1. As a result, the operator will not directly touch the external side of the bean-roasting chamber A1.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a roasting device having a body, a cooling disc, a heat dissipation seat mounted below the body and a base seat provided with a debris disc protruded from shaft center of the motor, characterized in that the base seat is provided with through holes and contains a fan, and the debris disc on the top portion of the fan is provided with through holes and a filter body is provided on the top of the through hole preventing objects from falling, facilitating the cooling of roasted bean on the cooling disc of the roasting device.

2. The roasting device of claim 1, wherein the outside of a roasting chamber is provided with a fastening hook having a protective frame provided with a fastener ring to prevent burn when directly in contact.

* * * * *